United States Patent
Zhou et al.

(10) Patent No.: US 7,942,646 B2
(45) Date of Patent: May 17, 2011

(54) MINIATURE HIGH SPEED COMPRESSOR HAVING EMBEDDED PERMANENT MAGNET MOTOR

(75) Inventors: Lei Zhou, Orlando, FL (US); Liping Zheng, Cerritos, CA (US); Louis Chow, Orlando, FL (US); Jayanta S. Kapat, Oviedo, FL (US); Thomas X. Wu, Oviedo, FL (US); Krishna M. Kota, Orlando, FL (US); Xiaoyi Li, Orlando, FL (US); Dipjyoti Acharya, Orlando, FL (US)

(73) Assignee: University of Central Florida Foundation, Inc, Orlando, FL (US)

( * ) Notice: Subject to any disclaimer, the term of this patent is extended or adjusted under 35 U.S.C. 154(b) by 1029 days.

(21) Appl. No.: 11/752,021

(22) Filed: May 22, 2007

(65) Prior Publication Data

US 2007/0269323 A1    Nov. 22, 2007

Related U.S. Application Data (60) Provisional application No. 60/802,465, filed on May 22, 2006.

(51) Int. Cl.
*F04B 35/04* (2006.01)
*F04B 39/06* (2006.01)
*H02K 5/16* (2006.01)
*H02K 21/12* (2006.01)

(52) U.S. Cl. .......... 417/366; 417/367; 417/423.12; 310/90; 310/156.11

(58) Field of Classification Search .......... 417/366, 417/367, 423.12; 310/156.11, 156.08, 156.12, 310/156.28, 90
See application file for complete search history.

(56) References Cited

U.S. PATENT DOCUMENTS

| | | | | |
|---|---|---|---|---|
| 2,718,193 A | * | 9/1955 | Zimsky | 417/423.12 |
| 2,888,193 A | * | 5/1959 | Greenwald | 417/370 |
| 7,300,263 B2 | * | 11/2007 | Mitsuda et al. | 417/423.7 |
| 2002/0106290 A1 | * | 8/2002 | Bader et al. | 417/366 |
| 2004/0146411 A1 | * | 7/2004 | Maceyka et al. | 417/366 |
| 2005/0062353 A1 | * | 3/2005 | Brown | 310/156.11 |
| 2005/0112003 A1 | * | 5/2005 | Jones et al. | 417/423.7 |

OTHER PUBLICATIONS

Zheng et al., "Design of a Superhigh-Speed Cryogenic Permanent Magnet Synchronous Motor," IEEE Transactions on Magnetics, vol. 41, No. 10, pp. 3823-3825 (2005).
Zaho et al., "A Highly Efficient 200 000 RPM Permanent Magnet Motor System," IEEE Transactions on Magnetics, vol. 43, No. 6, (Jun. 2007).

* cited by examiner

*Primary Examiner* — Charles G Freay
(74) *Attorney, Agent, or Firm* — Jetter & Associates, P.A.

(57) ABSTRACT

A high speed centrifugal compressor for compressing fluids includes a permanent magnet synchronous motor (PMSM) having a hollow shaft, the being supported on its ends by ball bearing supports. A permanent magnet core is embedded inside the shaft. A stator with a winding is located radially outward of the shaft. The PMSM includes a rotor including at least one impeller secured to the shaft or integrated with the shaft as a single piece. The rotor is a high rigidity rotor providing a bending mode speed of at least 100,000 RPM which advantageously permits implementation of relatively low-cost ball bearing supports.

14 Claims, 7 Drawing Sheets

MINIATURE HIGH SPEED COMPRESSOR HAVING EMBEDDED PERMANENT MAGNET MOTOR

CROSS-REFERENCE TO RELATED APPLICATIONS

The present application incorporates by reference in its entirety and claims priority to U.S. Provisional Patent Application Ser. No. 60/802,465, entitled "MINIATURE HIGH SPEED COMPRESSOR HAVING EMBEDDED PERMANENT MAGNET MOTOR" filed May 22, 2006.

STATEMENT REGARDING FEDERALLY SPONSORED RESEARCH OR DEVELOPMENT

The United States Government has certain rights in this invention pursuant to NAG3-2751 through the NASA Glenn Research Center.

FIELD OF THE INVENTION

The invention relates to centrifugal compressors, more specifically to miniature high speed centrifugal compressors based on permanent magnet motors.

BACKGROUND OF THE INVENTION

Compressors currently in use can generally be divided into two major categories, reciprocating and centrifugal. Reciprocating compressors reduce the volume of gas to increase pressure, while centrifugal compressor increase the kinetic energy of the gas and then convert the kinetic energy into increased pressure.

Advantages of centrifugal compressors over reciprocating compressors include lower sensitivity to gas purity, mechanically simpler operation and lower vibration levels. The major disadvantage of centrifugal compressors is that the attainable pressure rise is generally limited. Centrifugal compressors are also difficult to miniaturize it is due to its working principle, the pressure rise being dictated by the tip speed of the impeller which is mounted on a rotating shaft. If a small impeller is used, the impeller must be spun faster to keep the same tip speed and hence the same pressure rise. Reducing the size of the impeller to several centimeters causes the impeller to spin at several hundred thousand RPM. At this speed, problems including centrifugal stress in the rotor, as well as problems with the bearings, driving method and cooling issues all generally arise.

For high speed machines, gas lubricated bearings are mostly used. Such bearings can be classified under two categories namely, aerostatic and aerodynamic. The aerostatic type requires additional gas flow to function, which significantly reduces compressor efficiency, especially for miniature compressors which provide power levels on the order of only a few kilowatts. Aerodynamic type gas bearings can be fit into a small space and can be used without any additional gas supply. However, aerodynamic type gas bearings demand extremely high operational speeds in order to function properly and can cost about $40,000/pair to design, fabricate and test them. Superior aerodynamic bearing technology comprises of magnetic bearings, flexure pivot tilting pad bearings and foil bearings, etc. Magnetic bearings, which require relatively large space to install and complicated driving circuits, are difficult to shrink to fit into applications in which space is limited, such as for a miniature compressor. Tilting pad bearings that work satisfactorily above 100,000 RPM are difficult to find and are also costly. Gas foil bearings are generally too expensive (about $90,000/pair to design, fabricate and test) to use for a low-cost kilowatt level compressor. Gas foil bearings generally only have applications for relatively high-value applications, such as for aircraft engines.

As described above, to handle the high speed impeller rotation required by miniature compressors providing power levels on the order several kilowatts, available centrifugal compressors all use some type of non-contact bearing to handle the high speed. Although certain bearing embodiments can provide some advantages, disclosed bearing embodiments for miniature compressors which provide power levels on the order several kilowatts are typically expensive to implement and sensitive to the working environment. What is needed is a compact, high efficiency, high reliability centrifugal compressor design that provides kilowatt level power output, that is also economical to produce.

SUMMARY

A high speed centrifugal compressor for compressing fluids includes a permanent magnet synchronous motor (PMSM) having a hollow shaft, the being supported on its ends by ball bearing comprising supports. A permanent magnet core is embedded inside the shaft. A stator with a winding is located radially outward of the shaft. The PMSM includes a rotor including at least one impeller secured to the shaft or integrated with the shaft (as a single piece). The rotor is a high rigidity rotor providing a bending mode speed of at least 100,000 RPM which advantageously permits implementation of relatively low-cost ball bearing comprising supports.

The bending mode speed is defined as the speed above which the shaft becomes (and is properly theoretically treated as) a flexible shaft. Ball bearings are generally not suitable for flexible shafts, no matter how slow the shaft spins. At the speed range in which rotors according to the invention generally operate, being 100,000 to 315,000 RPM or more, typical ball bearings are unable to handle such a speed. For example, if the rotor bending mode speed is too low, say 90,000 RPM, and the rotor is forced to spin above this speed, the ball bearings will be damaged quickly. In a preferred embodiment, the ball bearings are high speed ball bearings comprising a ceramic ball, and a petroleum mineral lubricant-based grease is also provided. But even for a ceramic ball bearing together with such a special grease, operation with a flexible shaft is not possible. Accordingly, rotors according to the invention are rigid rotors, preferably remaining rigid rotors up to at least about 315,000 RPM. As defined herein:

i) a Rigid Rotor is that which, when balanced in any two arbitrarily selected planes, will remain within the specified balance tolerance at any speed up to and including its maximum service speed; and ii) a Flexible Rotor is that which does not satisfy the definition of a rigid rotor and which has a tendency to bend or distort due to centrifugal and unbalance forces, the effect of which can be induced or aggravated by changes in operating load and temperature.

The compressor can further comprise a housing enclosing the PMSM, wherein the housing includes an axially extending gas inlet and a gas outlet passage, passageways being created between the PMSM and the housing to convey the fluid from the inlet to the outlet. In one embodiment, the gas inlet and the gas outlet are disposed in a straight line. The shaft can include a diameter reduction on both of its ends. In an alternate embodiment, the gas inlet and outlet can be disposed in a direction which is perpendicular or angled to the rotor's center line.

In one embodiment, the stator is a slotless stator. In an alternate embodiment, the stator is a slotted stator. The ball bearing comprising supports can comprise a plurality of ceramic ball bearings. The ball bearings are preferably contained in a enclosure sealed and isolated from the fluid. The winding can comprise a multi-strand Litz wire winding.

In one embodiment, the rotor comprises a two pole rotor. In one arrangement, the winding and stator are integrated with an axial diffuser. The axial diffuser can include a bend-over section, wherein the impeller is radially extended followed by the axial diffuser with the bend-over section.

BRIEF DESCRIPTION OF THE DRAWINGS

There is shown in the drawings embodiments which are presently preferred, it being understood, however, that the invention can be embodied in other forms without departing from the spirit or essential attributes thereof.

FIG. 1(a) is a cross-sectional view of a permanent magnet synchronous motor (PMSM), according to an embodiment of the invention, while

FIG. 3(a) is a cut-away view of the front (input) section of the compressor, while

DETAILED DESCRIPTION

A high speed centrifugal compressor for compressing fluids comprises a permanent magnet synchronous motor (PMSM). The PMSM includes a hollow shaft. The shaft is supported on its ends by ball bearing comprising supports. A permanent magnet core is embedded inside the shaft. A winding then a stator is disposed radially outward out from the shaft, thus providing a radial-flux PMSM. The PMSM includes a rotor comprising at least one impeller which is secured to the shaft or made as a single piece with the shaft.

The rotor is a high rigidity rotor, wherein the rotor provides a critical bending mode speed of at least 100,000 RPM. As described above, significantly the high critical bending mode speed rotor enables the use of low-cost ball bearings. Although ball bearings have been well known for several decades, ball bearings have not been applied to miniature rotors because at the required speed required to generate power on the order of several kilowatts, the rotors become flexible rotors. As well known in the art and noted above, ball bearings cannot be used with flexible rotors.

A housing (casing) generally encloses the PMSM. The housing includes a gas inlet and a gas outlet. In a preferred embodiment, the gas inlet and gas outlet are disposed in a straight line. A straight line configuration facilitates serial stacking of compressors to provide a higher pressure ratio. Each compressor in the stack can be run at a different speed for optimized performance. In an alternate embodiment, the gas inlet and outlet can be disposed in a direction which is perpendicular or angled to the rotor's center line. This arrangement can reduce the total axial length of the compressor and beneficial to some applications.

The cooling system of a single stage compressor can also act as an intercooler between successive stages if the overall system is connected in series to provide a multi-stage compressor. Passageways are provided between the PMSM and the housing to convey a fluid from the inlet to the outlet.

Figure 1A:
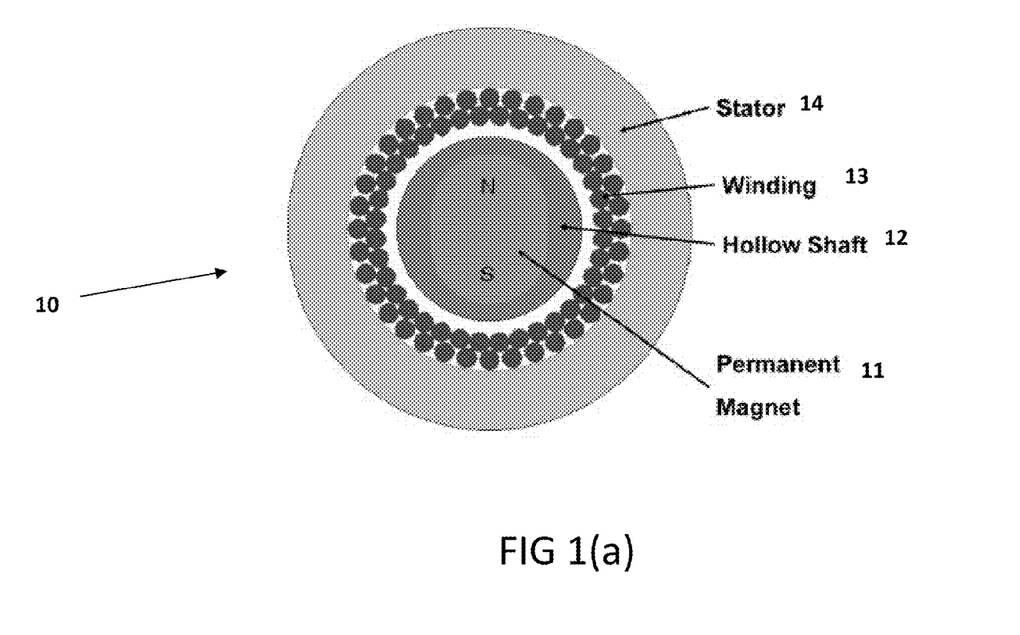

FIG. 1(a) is a cross-sectional view of a PMSM 10 according to an embodiment of the invention. The core includes a permanent magnetic material 11. For applications at 140 K or above, Neodinium-iron-boron (Nd—Fe—B) is generally used because it has the highest energy product compared to other available permanent magnetic materials. However, for temperatures below about 140 K, such as when applied to cryogenic coolers, Neodinium-iron-boron gets demagnetized fairly easily. Samarium cobalt (SmCo) can be used at cryogenic temperatures since it has a high energy product and is low temperature stable for its magnetic characteristics. The Curie temperature and the operating temperature of SmCo are very high which helps prevent demagnetization when assembling and welding.

A hollow shaft 12 surrounds magnetic material 11. The cross section of the permanent magnet 11 embedded in the shaft 12 can be an oval (as shown) or other non-spherical shape to avoid slip inside the shaft 12 upon rotation. It is also possible to use round shapes when tight fitting inside the shaft 12 is feasible.

A plurality of windings 13 are disposed radially outside shaft 12. Windings 13 are preferably multi-strand Litz wire windings. Multi-strand wire helps reduce eddy current loss in the winding. The term "Litz wire" is derived from the German word "litzendraht" meaning woven wire. Litz-Wire is a wire constructed of individual film insulated wires (magnetic wires) bunched or braided together in a uniform pattern. The size of individual wire and the number of strands depend on the required current and frequency.

The rotor is preferably a two pole rotor (a pair of N-S poles). The magnet is parallelly magnetized in diameter direction. A two-pole magnet consists of one north pole (N) and one south pole (S). A two-pole magnet design minimizes the magnetic flux leakage and driving signal frequency. The two-pole rotor provides a robust rotor construction suitable for high speed operation and also results in minimum machine fundamental electrical frequency that is important for reducing power electronic losses.

Stator 14 is disposed radially outside windings 13. The stator 14 shown in FIG. 1(a) is a slotless stator. A slotless stator minimizes core loss and stator teeth and eddy current loss in rotor, which are significant in ultra-high speed motors. A slotless design also helps to reduce vibrations caused by cogging torque. In one embodiment, the stator is formed from a Si-steel composite.

Figure 1B:
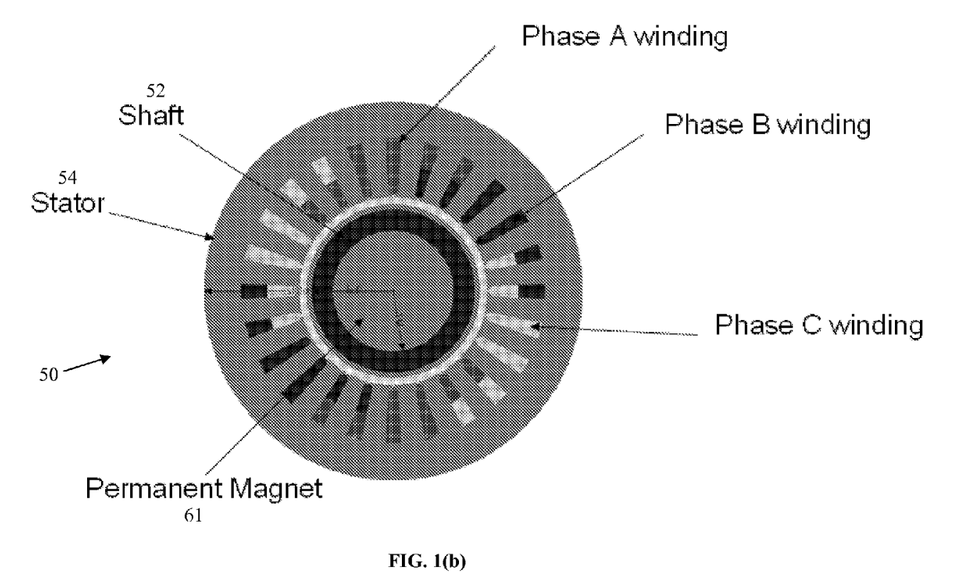
FIG. 1(b) is PMSM motor with a slotted stator according to another embodiment of the invention.

However, the stator of the motor can also be a slotted design, which the present Inventors have found can be a better choice as compared to a conventional stator in higher power applications, such as for a 2-3 kW motor. FIG. 1(b) is PMSM motor 50 with a slotted stator 54 according to another embodiment of the invention. PMSM 50 includes a hollow shaft 52 that surrounds the permanent magnet material 61. The cross section of the permanent magnet 61 embedded in the shaft 52 is shown as being round which is made practical (very little slip upon rotation) when tight fitting inside the shaft 52 is provided. The slotless stator 54 is a simple cylinder with wires between its inner wall and the shaft 52. Slotted stator 54 has some slots with small openings along its inside wall to accommodate the wires, comprising Phase A winding, Phase B winding and Phase C winding.

Figure 2:
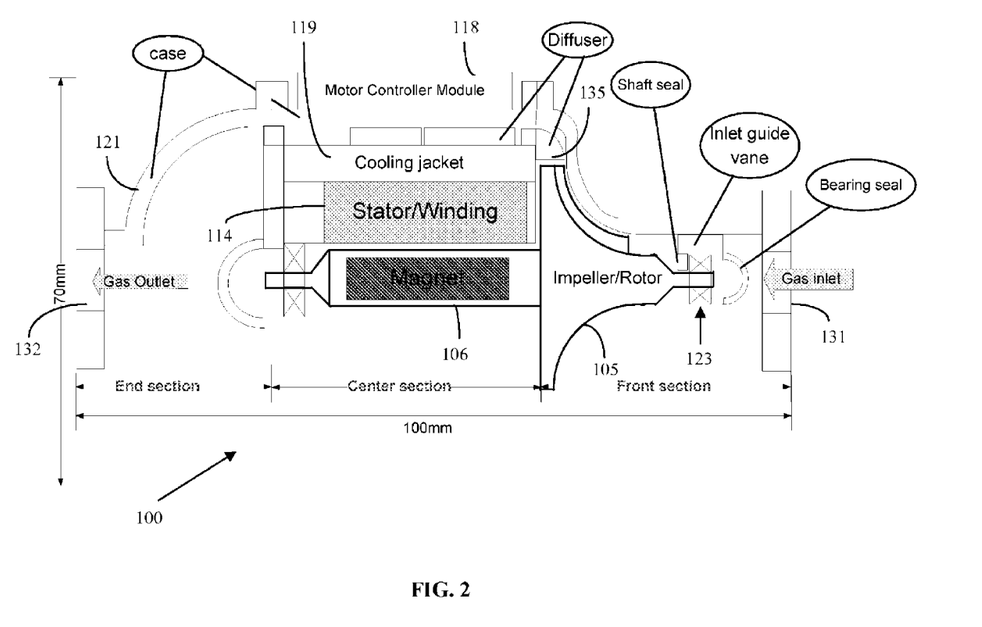
FIG. 2 is a cut-away view of a compressor according to an embodiment of the invention.

FIG. 2 is a cut-away view of a miniature compressor 100 according to an embodiment of the invention. The size of compressor 100 shown is 100 mm by 70 mm. The weight of compressor 100 is generally about 7 to 15 pounds. Outer case 121 surrounds the various components of compressor 100 and provides gas inlet 131 and gas outlet 132. The gas flow path includes bend over axial diffuser 135.

The rotor 105 is shown as rotor/impeller and has a diameter shrink of its shaft 106 at both ends. The PMSM portion of compressor 100 comprises rotor 105 which includes a hollow shaft 106 having a permanent magnet (shown as MAGNET) embedded therein, surrounded by stator/winding 114. Although not shown, compressor 100 can add another impeller at outlet side with a second diffuser attached.

Motor control module 118 provides proper driving current to operate the motor. Electrical connections which provide electricity for required operation are not shown. Cooling jacket 119 is also provided within case 121 to provide integrated thermal management for motor stator/winding 114, bearing block 123 having a plurality of bearings therein, and motor controller 118. The motor controller 118, bearing block 123 and stator/winding 114 are all cooled with this integrated water (or other fluid) cooling system. The cooling line is piped through bearing support board 441 (shown in FIG. 4) to flow into the cooling jacket 119, cooling the stator/winding and the bearings. The return coolant from cooling jacket 119 is piped to cool motor controller module 118.

In order to utilize ball bearing comprising supports, as noted above, rotor 105 is a high rigidity rotor, wherein the rotor provides a critical bending mode speed of at least 100,000 RPM. The length of rotor shaft 106 is made short (about 60 mm shown) to increase the structural stiffness and hence the rigidity of the rotor. The impeller is attached to the motor shaft 106 and the overall length of the impeller is also minimized to the extent possible. The rigidity of a rotor depends on two factors: mass and structural stiffness. Using lighter and harder materials will generally favor the rigidity because it reduces mass while increasing the structural stiffness. A high strength titanium alloy has been used by the Inventors as the rotor material to obtain maximum stiffness.

Because the permanent magnet is embedded inside the hollow shaft, the shaft must generally be made in two pieces. The stiffness of a multi-piece rotors decreases with increasing the number of attached pieces. The major piece includes a hole and a plug, and the respective pieces are preferably welded together using electron-beam welding (EBW). Using the above two-piece EBW method, the inventors have determined that the rotor rigidity is increased sufficiently to enable it to spin up to 315,000 RPM on ceramic ball bearings. This allows the rotor to operate under bending mode. Shorter and larger diameter shafts generally have higher stiffness than longer and slimmer ones. In a preferred embodiment, the rotor is enlarged at its diameter and shortened to the maximum and then used a step down at both ends to fit in a small bearing, because small bearing has higher maximum rotating speed and low losses.

As described below relative to FIG. 2, the high-solidity rotor has a diameter shrink at both ends to fit into ¼" bore ball bearings. This shrink keeps the dN value of the bearing, which is derived by multiplying the mean bearing diameter by the speed in rpm, under 2 million mm*N, which is the limit for most ball bearings.

Exemplary specifications for the compressor shown in FIG. 2 are as follows:
Pressure ratio: up to 2.0 per stage, depending on gas type
Temperature range: 60 K to 350 K
Volume flow rate: 0.03-0.5 ft$^3$/sec
Rotating speed: up to 315,000 RPM
Compression Efficiency: up to 78%
Motor Efficiency: 92%

The compressor 100 includes three major sections, which can be defined as the front section, center section and end section. A more detail view of these respective sections is shown in FIG. 3, FIG. 4 and FIG. 5, respectively.

Figure 3A:
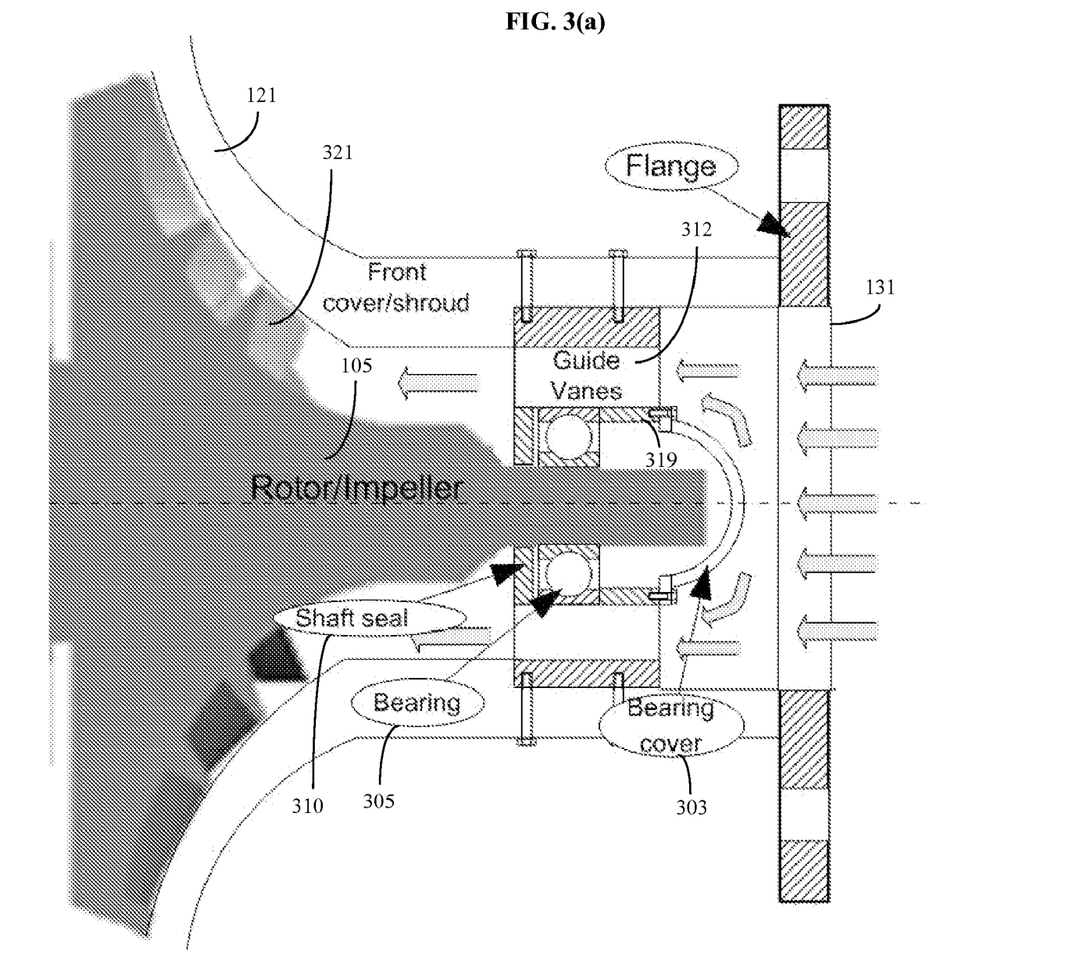

FIG. 3(a) is a cut-away view of the front (input) section of an exemplary compressor according to the present invention. This section shows how the ball bearing comprising support is installed in the front bearing cover 303 along with a structure for avoiding contamination. The incoming gas entering the compressor through inlet 131 is guided by the bearing cover 303 to avoid direct contact with bearings 305 and associated lubricant materials. After the bearings 305 there is a shaft seal 310 to prevent the direct contact of the gas with the bearings 305 and related materials. This structure ensures that the gas is not-contaminated by bearing lubricant. Guide vanes 312 produce a desired gas inlet angle to match the blades 321 of impeller. The bearing block 319 is cooled by the incoming gas.

Figure 3B:
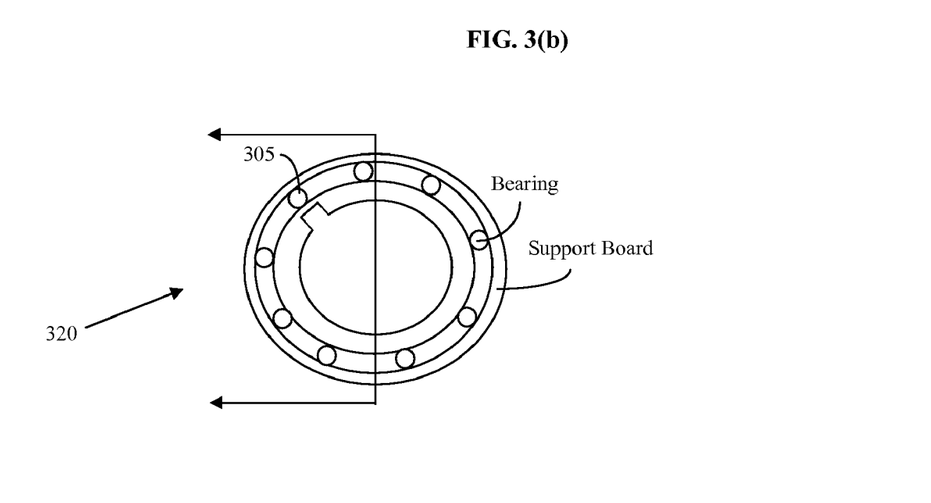
FIG. 3(b) shows a more detailed view of the ball bearing comprising support looking in toward the inlet of the compressor along the axis of the rotor.

FIG. 3(b) shows a more detailed view of the ball bearing comprising support 320 looking in toward the inlet along the axis of the rotor. Bearings are shown as 305. The diameter reduced ends of each side of the rotor fits into the open region in the center of the ball bearing comprising support.

Figure 4:
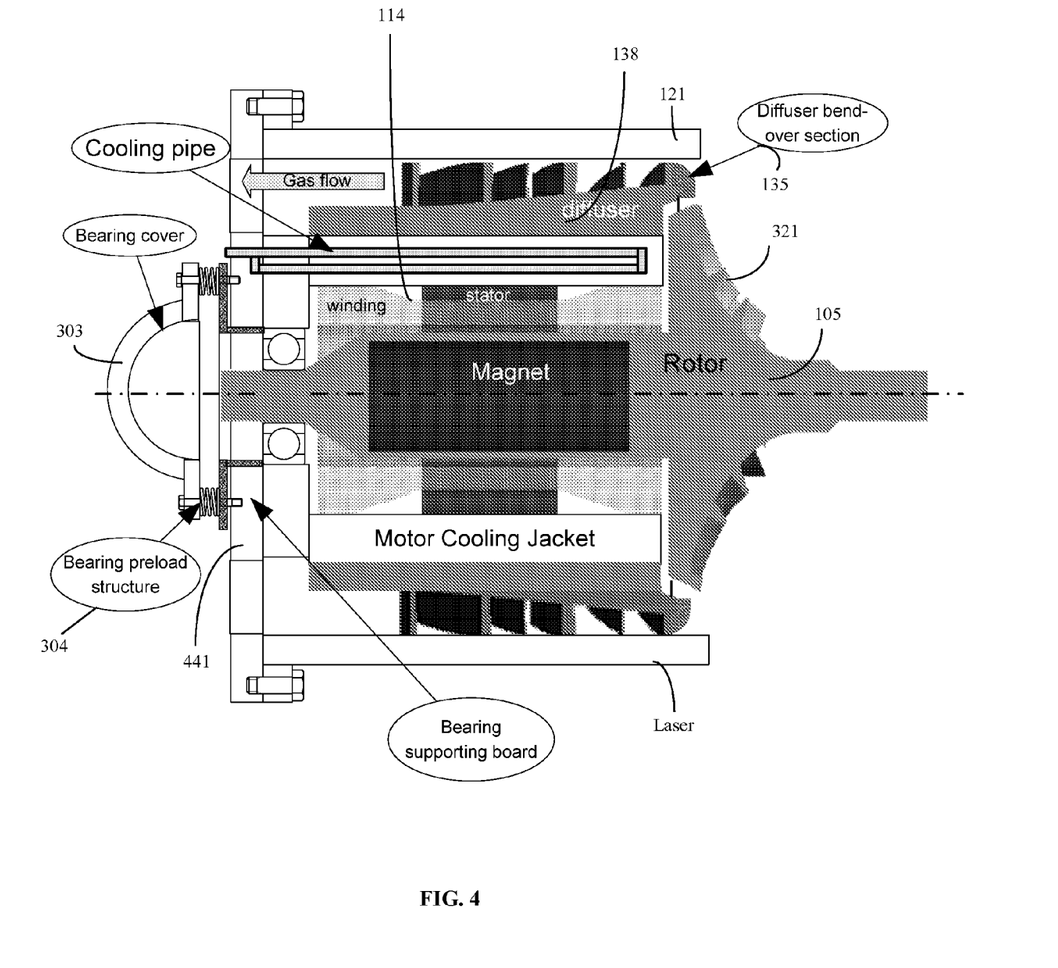
FIG. 4 is a cut-away view of the center section of the compressor showing the bearing support/preload structure.
Figure 5:
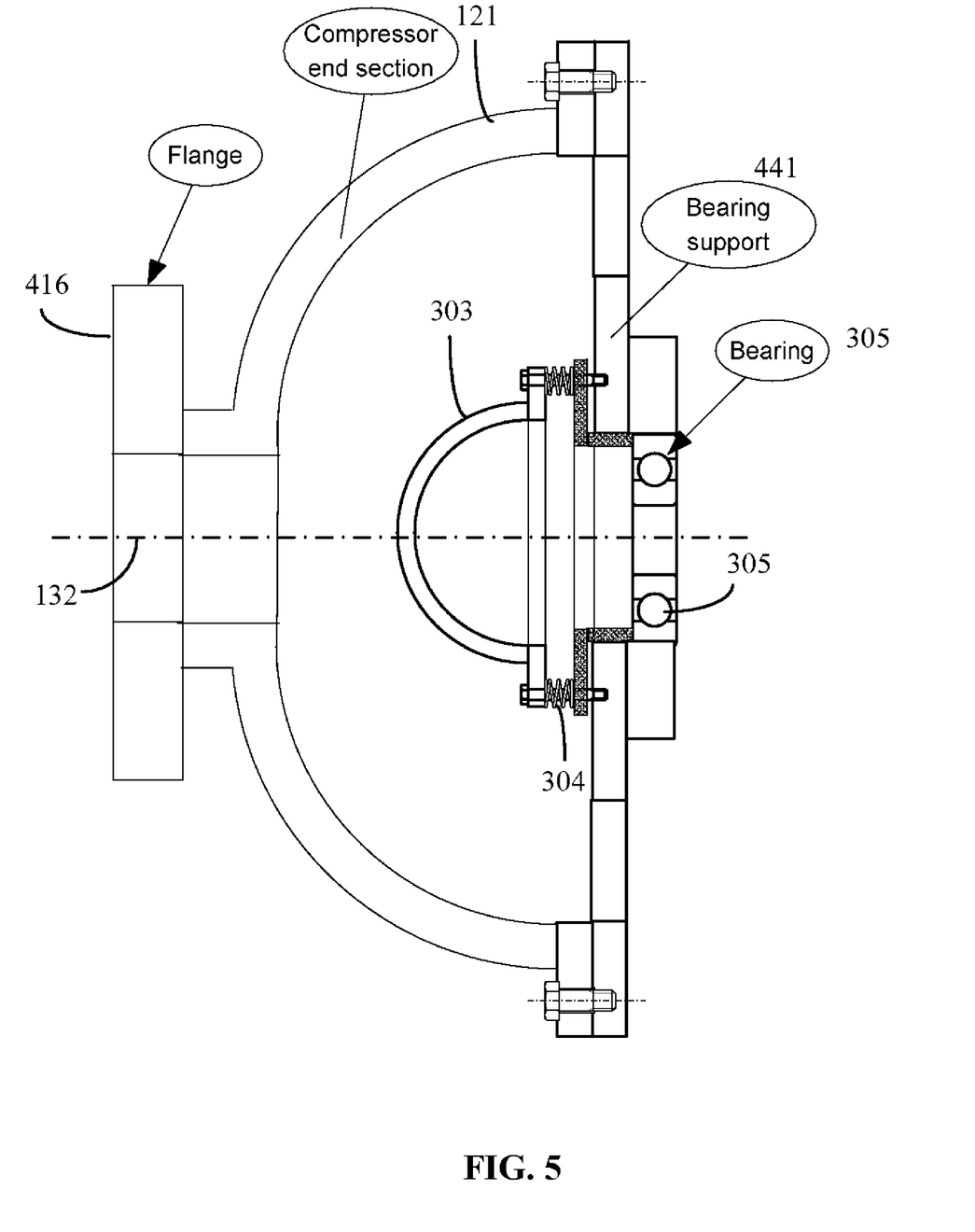
FIG. 5 is a cut-away view of the end section of compressor having a bearing support comprising bearing support board.

FIG. 4 is a cut-away view of the center section of an exemplary compressor according to the invention showing the bearing support/preload structure. The center section is the most complicated of the respective sections because it has the motor inside with the impeller/rotor 105 and diffuser 138. It also includes the cooling jacket 119 for the motor winding/stator 114. The bearings are supported by a supporting board 441, which also holds the power cord (not shown) and cooling pipe 119 for the PMSM. The bearing is also covered by a bearing cover 303. Bearing cover 303 is also preloaded with spring-preload structure 304.

With the design of bearing covering mechanism and bearing preload mechanism, the compressor can offer contamination free gas passage and excellent rotating stability. Because of the preferred straight-line design and bearing-inside design, gas-leakage is essentially eliminated, which is extremely difficult to implement for a super high speed shaft. Straight-line inlet and outlet eliminates the need for the supporting bracket in applications and simplify the outside piping. Accordingly, no gas turns, extra-flanges or connectors are required.

The winding/stator 114 is integrated with the axial diffuser 138. Diffuser 138, cooling jacket 119 and stator/winding 114 can be seamlessly integrated. The diffuser can be machined out with a hollow cylindrical center to hold the cooling jacket. These two pieces can be welded or glued together for best heat spreading. Then the stator/winding piece can be inserted in and positioned with a high thermally-conductive bonding material, such as high thermal-conductivity epoxy. After the epoxy or other bonding material gets cured, the winding/stator piece is invisible and firmly attached to the cooling jacket. So these three pieces can be assembled together permanently with good thermal communication, which allows the coolant to cool the winding/stator 114 as well as the diffuser 138. The diffuser itself does not generate any heat, but a cold diffuser helps cool down the compressed gas and this will help the diffuser efficiency improve a little. Vaned bend-over diffuser 135 provides a fluid transition from mixed-flow direction to axial direction smoothly with low loss. This bend-over configuration minimizes the radial size of the compressor and fits it for some space-tight applications. The bend-over and axial direction diffuser combines small size and high aero-dynamic performance.

FIG. 5 is a cut-away view of the end section of compressor 100 having a bearing support comprising bearing support board 441, bearing cover 303 and bearings 305. This section also includes case 121 and end flange 416.

Figure 6:
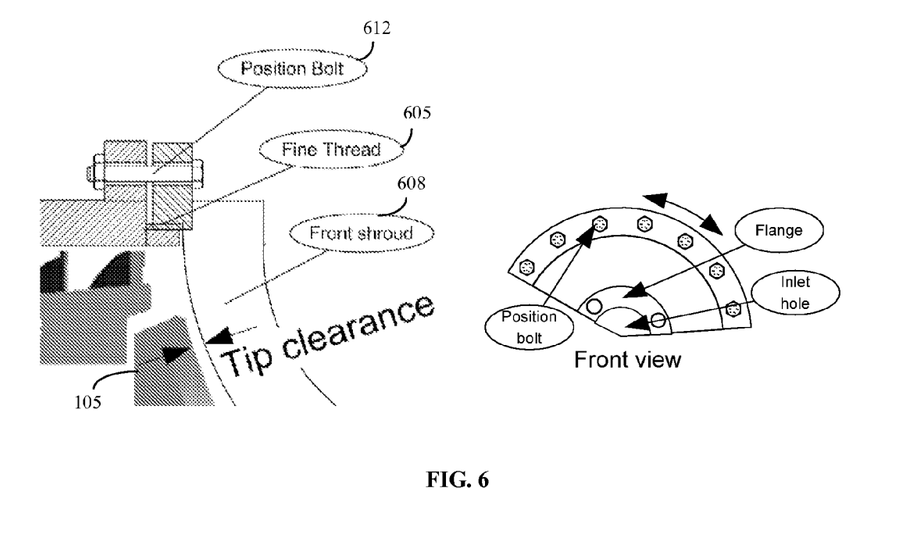
FIG. 6 shows a tip clearance adjusting mechanism and methodology to achieve a desired spacing (clearance) between impeller blades and the case of the compressor.

FIG. 6 shows a tip clearance adjusting mechanism and methodology to achieve a desired spacing (clearance) between blades 321 and case 121. This mechanism is preferably realized by a fine threading 605 between front section and center section of the compressor. The front shroud 608 can rotate on the thread 605 to generate small axial movement between front shroud and rotor/impeller 105. As soon as the desired tip clearance is obtained, position bolts 612 can be tightened to fix the desired clearance. The tip clearance can be adjusted to provide optimal performance and reliability. There are multiple bolts around the periphery so that they can be tightened at desired angular intervals. By using a slotted design on both flanges for the bolt holes and by using a pitch of 0.5 mm or finer, a clearance adjustment accuracy of 0.01 mm or smaller can be achieved.

Figure 7:
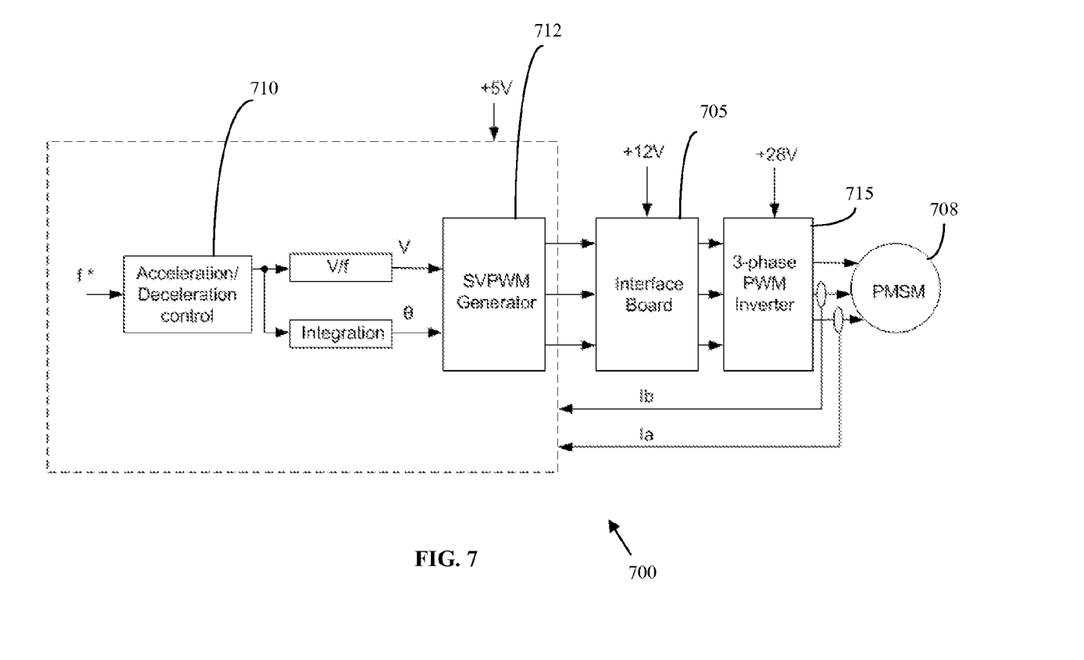
FIG. 7 shows the schematic diagram of a typical PMSM controller that can be used with the present invention.

FIG. 7 shows the schematic diagram of an exemplary PMSM controller 700 that can be used with the invention. The controller 700 provides the desired synchronous operation by maintaining the rotor and magnetic field of the stator of the PMSM 708 rotating at the same speed. A TI DSP board 2407A (Texas Instruments, Incorporated, Dallas Tex.) has been used for e space vector pulse width modulation (SVPWM) generator 712. The Interface board 705 is used to provide the gate drive for the 3-phase PWM inverter 715. High power, high speed MOSFETs are preferably used in the 3-phase PWM inverter. The acceleration/deceleration control block 710 is used to smooth the command frequency (f*), and output the smoothed frequency (f). V/f block outputs voltage command based on predefined V/f profile, and the integration block outputs the corresponding position. The position and voltage commands are input to SVPWM block to generate PWM signal. The current feedback (Ia and Ib) are used for optimal V/f control.

Compressors according to the invention can be used for any application which can benefit from a compact, high efficiency, high reliability centrifugal compressor that provides kW level power output. For example, compressors according to the invention can provide an ultra-compact gas compression device for essentially all gases including air, nitrogen, neon, carbon dioxide and the various freons.

Compressor according to the invention are specifically designed to work in a reverse-Brayton cryocooler. Accordingly, compressor according to the invention are optimized for mid-range cooling power (20W-100W, typically) around the 80K temperature range. However, compressors according to the invention can service any application requiring miniature but powerful gas compression. Because of its size and ability to operate when driven by batteries, the invention is ideal for mobile personal cooling. Compressor according to the invention are also capable of remove significant heat under a typical hot day environment (90-100° F.; about 30° C.). Another of the many applications for the invention is for fuel-cell compressed air supplying. Compressor according to the invention can be used with a variety of fuel-cells, including mobile fuel-cells.

As noted above, compressors according to the invention can compress refrigerant fluids including freon. If working in a household A/C system, compressors according to the invention in conjunction with a suitable condenser and fan can remove up to about 3 kW of heat. Machines according to the present invention can also be run in reverse. In this embodiment, instead of supplying electric power to drive the compressor to compress gas, machines according to the present invention can be used to extract energy from high pressure gas to generate electric power output as a turbine-expander/alternator.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. A high speed centrifugal compressor for compressing fluids, comprising:
   a permanent magnet synchronous motor (PMSM) comprising:
      a hollow shaft, said shaft being supported on its ends by ball bearing comprising supports,
      a permanent magnet core embedded inside said shaft,
      a stator with a winding located radially outward of said shaft, and
      a rotor comprising at least one impeller integrated with said shaft, wherein said rotor is a high rigidity rotor, said rotor providing a bending mode speed of at least 100,000 RPM.

2. The compressor of claim 1, further comprising a housing enclosing said PMSM, said housing including an axially extending gas inlet and a gas outlet passage, wherein passageways are created between said PMSM and said housing to convey said fluid from said inlet to said outlet.

3. The compressor of claim 1, wherein said gas inlet and gas outlet are disposed in a straight line.

4. The compressor of claim 1, wherein said shaft includes a diameter reduction on both of its ends.

5. The compressor of claim 1, wherein said stator is a slotless stator.

6. The compressor of claim 1, wherein said stator is a slotted stator.

7. The compressor of claim 1, wherein said ball bearing comprising supports comprise a plurality of ceramic ball bearings.

8. The compressor of claim 7, wherein said ball bearings are contained in a enclosure sealed and isolated from said fluid.

9. The compressor of claim 1, wherein said winding comprises a multi-strand Litz wire winding.

10. The compressor of claim 1, wherein said rotor comprises a two pole rotor.

11. The compressor of claim 1, wherein said winding and said stator are integrated with an axial diffuser.

12. The compressor of claim 11, wherein said axial diffuser includes a bend-over section, said impeller being radially extended followed by said axial diffuser with said bend-over section.

13. The compressor of claim 12, wherein said axial diffuser comprises a vaned bend-over diffuser, said vaned bend-over diffuser comprising a plurality of vanes.

14. The compressor of claim 1, wherein said impeller is integrated with said shaft as a single piece.

* * * * *

UNITED STATES PATENT AND TRADEMARK OFFICE
CERTIFICATE OF CORRECTION

PATENT NO.         : 7,942,646 B2                                              Page 1 of 1
APPLICATION NO.    : 11/752021
DATED              : May 17, 2011
INVENTOR(S)        : Lei Zhou et al.

It is certified that error appears in the above-identified patent and that said Letters Patent is hereby corrected as shown below:

On the Title Page
Item 73, please correct the Assignee to read "University of Central Florida Research Foundation, Inc., Orlando, FL."

Signed and Sealed this
Twenty-eighth Day of June, 2011

David J. Kappos
*Director of the United States Patent and Trademark Office*